United States Patent
Zeng

(10) Patent No.: US 11,291,005 B2
(45) Date of Patent: *Mar. 29, 2022

(54) TRAFFIC MANAGEMENT TECHNIQUE FOR VARIABLE BANDWIDTH NETWORKS USING RSVP

(71) Applicant: Aviat U.S., Inc., Austin, TX (US)

(72) Inventor: Chaoming Zeng, Milpitas, CA (US)

(73) Assignee: Aviat U.S., Inc., Austin, TX (US)

( * ) Notice: Subject to any disclaimer, the term of this patent is extended or adjusted under 35 U.S.C. 154(b) by 115 days.

This patent is subject to a terminal disclaimer.

(21) Appl. No.: 16/866,830

(22) Filed: May 5, 2020

(65) Prior Publication Data

US 2020/0305160 A1 Sep. 24, 2020

Related U.S. Application Data

(63) Continuation of application No. 16/058,972, filed on Aug. 8, 2018, now Pat. No. 10,645,695.

(Continued)

(51) Int. Cl.
*H04W 72/04* (2009.01)
*H04L 1/00* (2006.01)
(Continued)

(52) U.S. Cl.
CPC ........... *H04W 72/0453* (2013.01); *H04L 1/00* (2013.01); *H04L 1/0003* (2013.01);
(Continued)

(58) Field of Classification Search
None
See application file for complete search history.

(56) References Cited

U.S. PATENT DOCUMENTS 5,687,167 A * 11/1997 Bertin ................ H04L 12/5602
370/254
6,470,029 B1 10/2002 Shimizu
(Continued)

FOREIGN PATENT DOCUMENTS

EP 2523398 11/2012

OTHER PUBLICATIONS

European Application No. 18843870.9, Supplementary European Search Report dated Apr. 1, 2021, 9 pages.
(Continued)

*Primary Examiner* — Tri H Phan
(74) *Attorney, Agent, or Firm* — Sheppard, Mullin, Richter & Hampton LLP

(57) ABSTRACT

An example system comprises a router configured to receive a bandwidth update associated with a change in bandwidth over a wireless channel, determine if the change in bandwidth identified in the bandwidth update results in bandwidth being over-reserved at at least one priority level, previously reserved bandwidth of the wireless channel being associated with a plurality of different priority levels, the previously reserved bandwidth being previously reserved based on a plurality of path requests from a head end router, each path request including at least one priority level and a bandwidth reservation request, if the change in bandwidth results in bandwidth being over-reserved, then preempt a lowest priority path request, based in the preemption of the lowest priority path request, update reserved bandwidth of the wireless channel of at least one priority level, and provide a message to the head end router regarding the change of bandwidth.

17 Claims, 11 Drawing Sheets

Related U.S. Application Data

(60) Provisional application No. 62/542,756, filed on Aug. 8, 2017.

(51) Int. Cl.

| | | |
|---|---|---|
| *H04L 12/911* | (2013.01) | |
| *H04W 24/08* | (2009.01) | |
| *H04W 28/02* | (2009.01) | |
| *H04L 47/72* | (2022.01) | |
| *H04L 27/36* | (2006.01) | |
| *H04L 5/00* | (2006.01) | |
| *H04L 27/34* | (2006.01) | |

(52) U.S. Cl.
CPC ............ *H04L 1/0009* (2013.01); *H04L 47/72* (2013.01); *H04W 24/08* (2013.01); *H04W 28/0252* (2013.01); *H04L 5/0064* (2013.01); *H04L 27/34* (2013.01); *H04L 27/367* (2013.01)

(56) References Cited

U.S. PATENT DOCUMENTS

| | | | |
|---|---|---|---|
| 6,546,017 B1 | 4/2003 | Khaunte | |
| 6,665,273 B1 | 12/2003 | Goguen et al. | |
| 7,127,056 B2 * | 10/2006 | Hu | H04L 45/10 379/221.03 |
| 7,333,438 B1 * | 2/2008 | Rabie | H04L 41/0654 370/216 |
| 7,359,386 B2 * | 4/2008 | Vasseur | H04L 29/06 370/229 |
| 7,577,161 B2 | 8/2009 | Li et al. | |
| 7,826,367 B2 * | 11/2010 | So | H04L 45/22 370/235 |
| 7,843,876 B2 | 11/2010 | Holt et al. | |
| 8,005,103 B2 | 8/2011 | Liu | |
| 8,159,946 B2 | 4/2012 | Baek et al. | |
| 8,174,970 B2 | 5/2012 | Adamczyk et al. | |
| 8,199,642 B2 | 6/2012 | Vasseur et al. | |
| 8,264,953 B2 | 9/2012 | Licardie | |
| 8,312,145 B2 | 11/2012 | Rabie et al. | |
| 8,339,939 B2 | 12/2012 | Csaszar et al. | |
| 8,462,638 B2 | 6/2013 | Gandhi et al. | |
| 8,463,916 B2 * | 6/2013 | Rabbie | H04L 45/306 709/227 |
| 8,521,889 B2 | 8/2013 | Anschutz et al. | |
| 8,531,954 B2 * | 9/2013 | McNaughton | H04L 12/6418 370/235 |
| 8,576,706 B2 * | 11/2013 | So | H04L 45/50 370/227 |
| 8,660,006 B2 | 2/2014 | Torres et al. | |
| 8,717,893 B2 | 5/2014 | Chou et al. | |
| 8,824,488 B2 | 9/2014 | Choudhury et al. | |
| 9,125,084 B2 | 9/2015 | Zeng | |
| 9,253,097 B1 | 2/2016 | Barman | |
| 9,577,925 B1 | 2/2017 | Bahadur et al. | |
| 9,667,559 B2 | 5/2017 | Bhattacharya | |
| 10,382,341 B2 * | 8/2019 | Venkataraman | H04L 47/72 |
| 2014/0341042 A1 | 11/2014 | Racz | |
| 2016/0277959 A1 | 9/2016 | Venkataraman | |
| 2017/0134288 A1 | 5/2017 | Funasaki | |

OTHER PUBLICATIONS

Awduche, D., et al., "RSVP-TE: Extensions to RSVP for LSP Tunnels", Network Working Group, Request for Comments: 3209, Category: Standards Track, retrieved from the internet at <URL: https://tools.ietf.org/pdf/irc3209.pdf>, [retrieved on Jul. 15, 2020], XP055715217, Dec. 31, 2001, 61 pages.

Olaussen, E., et al., "A Policy-Based Priority and Precedence Framework for Military IP Networks", MILCOM 2004, 2004 IEEE Military Communications Conference, vol. 2, Monterey, CA, USA, Oct. 31, 2004 (Oct. 31, 2004), XP010825755, pp. 827-833.

International Application No. PCT/US2018/045872, International Search Report and Written Opinion dated Oct. 10, 2018, (See U.S. Appl. No. 16/058,972).

* cited by examiner

| Priority | Unreserved Bandwidth |
|---|---|
| 0 | 50 |
| 1 | 50 |
| 2 | 20 |
| 3 | 10 |
| 4 | 10 |
| 5 | 10 |
| 6 | 10 |
| 7 | 10 |

Active LSPs:
LSP3 Pri=0 Bw=50
LSP5 Pri=2, Bw=30
LSP1 Pri=3 Bw=10
Preempted LSPs:
LSP2 Pri=5 Bw=20

LSP5 Req
Pri=(4,2)
BW=30

510

| Priority | Unreserved Bandwidth |
|---|---|
| 0 | 50 |
| 1 | 50 |
| 2 | 50 |
| 3 | 40 |
| 4 | 40 |
| 5 | 20 |
| 6 | 20 |
| 7 | 20 |

Active LSPs:
LSP3 Pri=0 Bw=50
LSP1 Pri=3 Bw=10
LSP2 Pri=5 Bw=20
Rejected LSPs:
LSP4 Pri=5, Bw=30

TRAFFIC MANAGEMENT TECHNIQUE FOR VARIABLE BANDWIDTH NETWORKS USING RSVP

CROSS-REFERENCE TO RELATED APPLICATIONS

The present application is a continuation of U.S. Non-Provisional patent application Ser. No. 16/058,972 filed Aug. 8, 2018, and entitled "Traffic Management Technique For Variable Bandwidth Networks Using RSVP", now U.S. Pat. No. 10,645,695, which claims benefit of U.S. Provisional Patent Application No. 62/542,756 filed Aug. 8, 2017, and entitled "Traffic Engineering Technique for Variable Bandwidth Networks Using RSVP" which are incorporated by reference herein.

BACKGROUND

1. Field of the Invention(s)

The present invention(s) generally relate to traffic management for wireless networks using RSVP. More particularly, the invention(s) relate to systems and methods for network data traffic management for variable bandwidth networks using RSVP.

2. Description of Related Art

Unlike fibre, copper, or any other transport technology, non-standard and dynamically changing bandwidths along with complex link aggregation and protection schemes make some wireless, radio frequency networks (e.g., microwave networks) complex and different. Regular routers are not designed for such networks and rely on slow, protocol-based notifications to gather data from the underlying transport network to optimize behavior. Sometimes worse, regular routers use only manual configured fixed bandwidth. This lack of dynamic or adaptive media awareness in regular routers significantly impacts network performance, reliability, and operations cost.

SUMMARY

An example method comprises receiving a bandwidth update associated with a change in bandwidth over a wireless channel, determining if the change in bandwidth identified in the bandwidth update results in bandwidth being over-reserved at least one priority level, previously reserved bandwidth of the wireless channel being associated with a plurality of different priority levels, the previously reserved bandwidth being previously reserved based on a plurality of path requests from a head end router, each path request including at least one priority level of the plurality of different priority levels and a bandwidth reservation request, if the change in bandwidth identified in the bandwidth update results in bandwidth being over-reserved, then preempt a lowest priority path request of the previously received plurality of path requests, based in the preemption of the lowest priority path request, update reserved bandwidth of the wireless channel of at least one priority level of the plurality of priority levels, and provide a message to the head end router regarding the change of bandwidth to direct data on an alternate path away from the wireless channel or delay the data until unreserved bandwidth is available over the wireless channel.

The bandwidth may be changed due to a change of coding modulation over the wireless channel. In some embodiments, the coding modulation is changed due to changes in weather conditions affecting a quality of the wireless channel. In various embodiments, the wireless channel is a microwave wireless channel.

The method may further comprise determining if, after the reserved bandwidth of the wireless channel is updated, the bandwidth is still over-reserved, if, after the reserved bandwidth of the wireless channel is updated, the bandwidth is still over-reserved, preempt the next-lowest priority path request of the previously received plurality of path requests, and based in the preemption of the next-lowest priority path request, update reserved bandwidth of the wireless channel of at least one priority level of the plurality of priority levels, wherein the message to the head end router indicating the preemption of the lowest priority path request and the next-lowest priority path request.

In some embodiments, the method may further comprise directing data to an alternate path based on the preemption of the lowest priority path request. in various embodiments, each path request includes a hold priority and a setup priority, wherein the at least one priority level is the hold priority, the hold priority indicating a value associated with a level of priority of the plurality of priority levels for maintaining priority once bandwidth is reserved based on the path request, the setup priority indicating a value associated with a level of priority of the plurality of priority levels for setting up a new bandwidth reservation based on the path request.

The method may further comprise receiving a new path request with a new hold priority and a new setup priority, comparing the new setup priority to at least one hold priority of at least one previously received path request, and preempting the at least one previously received path request based on the comparison. In some embodiments, the method may further comprise receiving a new path request with a new hold priority and a new setup priority, comparing the new setup priority to at least one hold priority of at least one previously received path request, and refusing the new path request based on the comparison. In various embodiments, an RSVP table indicates the previously reserved bandwidth previously reserved based on a plurality of path requests from the head end router.

An example system may comprise a first router configured to receive a bandwidth update associated with a change in bandwidth over a wireless channel, determine if the change in bandwidth identified in the bandwidth update results in bandwidth being over-reserved at least one priority level, previously reserved bandwidth of the wireless channel being associated with a plurality of different priority levels, the previously reserved bandwidth being previously reserved based on a plurality of path requests from a head end router, each path request including at least one priority level of the plurality of different priority levels and a bandwidth reservation request, if the change in bandwidth identified in the bandwidth update results in bandwidth being over-reserved, then the router is further configured to preempt a lowest priority path request of the previously received plurality of path requests, based in the preemption of the lowest priority path request, the router is further configured to update reserved bandwidth of the wireless channel of at least one priority level of the plurality of priority levels, and provide a message to the head end router regarding the change of bandwidth to direct data on an alternate path away from the wireless channel or delay the data until unreserved bandwidth is available over the wireless channel.

An example non-transitory computer readable medium comprising executable code. The code may be executable by at least one processor to perform a method. The method may comprise receiving a bandwidth update associated with a change in bandwidth over a wireless channel, determining if the change in bandwidth identified in the bandwidth update results in bandwidth being over-reserved at least one priority level, previously reserved bandwidth of the wireless channel being associated with a plurality of different priority levels, the previously reserved bandwidth being previously reserved based on a plurality of path requests from a head end router, each path request including at least one priority level of the plurality of different priority levels and a bandwidth reservation request, if the change in bandwidth identified in the bandwidth update results in bandwidth being over-reserved, then preempt a lowest priority path request of the previously received plurality of path requests, based in the preemption of the lowest priority path request, update reserved bandwidth of the wireless channel of at least one priority level of the plurality of priority levels, and provide a message to the head end router regarding the change of bandwidth to direct data on an alternate path away from the wireless channel or delay the data until unreserved bandwidth is available over the wireless channel.

BRIEF DESCRIPTION OF THE DRAWINGS

FIGS. 5a and 5b depict a process of controlling LSP over a microwave wireless link between two converged microwave routers in some embodiments.

DETAILED DESCRIPTION OF THE INVENTION

In various embodiments, traffic engineering technique using RSVP is presented for IP/MPLS RF (e.g., microwave) networks with variable bandwidth (e.g., such as Adaptive Coding and Modulation (ACM), Layer 1 Link Aggregation (L1LA), and/or other link aggregation techniques). In some embodiments, a wireless router includes an adaptive media awareness (AMA) technique which provides fast information about bandwidth and channel status change of wireless links. IP/MPLS routers can use this information to automatically update RSVP reservation table after bandwidth change. In one example, lower priority LSPs can be pre-empted if bandwidth reserved previously exceeds the new maximum reservable bandwidth. Pre-empted LSP head-ends may be notified through messages (e.g., RSVP PATH Error messages) and data rerouted to other links with sufficient bandwidth if those exist.

Although the routers and networks discussed herein are described using examples of microwave routers and microwave networks, it will be appreciated that embodiments discussed herein may apply to any network traffic device over any unwired networks.

Figure 1:
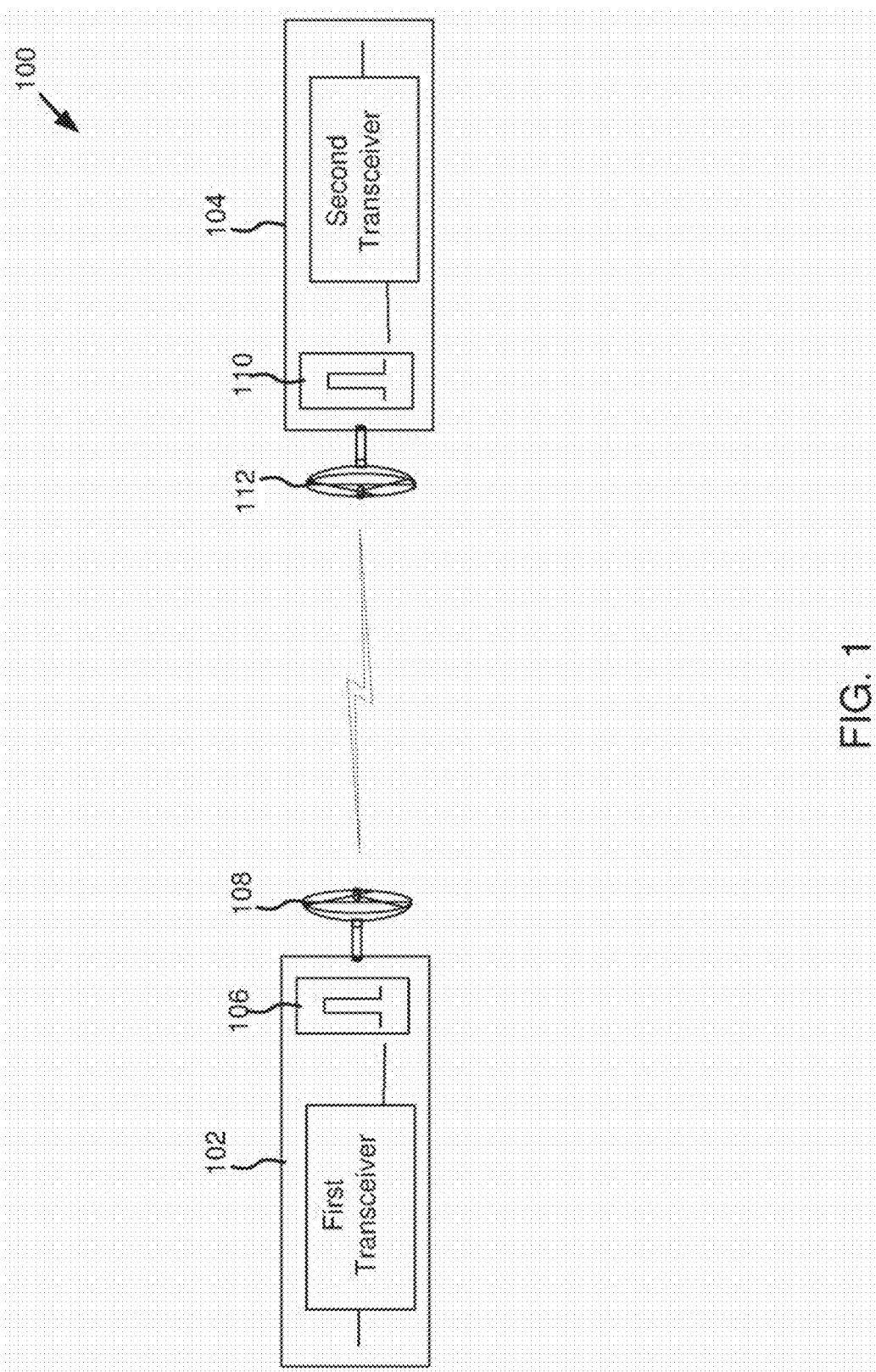
FIG. 1 depicts an example environment including transceiver radio frequency units (RFU) in some embodiments.

FIG. 1 depicts an example environment 100 including transceiver radio frequency units (RFU) 102 and 104 in some embodiments. The transceiver RFUs 102 and 104 depicted in FIG. 1 are in wirelessly communication with each other. In various embodiments, the transceiver RFUs 102 and 104 communicate over microwave radio frequencies although it will be appreciated that transceiver RFUs 102 and 104 may communicate over any portion of the wireless spectrum (e.g., not limited to the microwave spectrum).

Further, although depicted as communicating directly to each other, each of the transceiver RFUs 102 and 104 may communicate via a tower or any other receivers, transmitters, and/or transceivers.

The transceiver RFU 102 includes a first transceiver, a waveguide 106, and an antenna 108. The transceiver RFU 104 includes a first transceiver, a waveguide 110, and an antenna 112. In some embodiments, the transceiver RFU 102 and/or the transceiver 104 may each include or each be in communication with a router (e.g., a converged microwave router).

Adaptive coding modulation (ACM) allows dynamic change of modulation and FEC level to accommodate for radio path fading which is typically due to weather changes on a transmission path. Benefits of ACM may include improved spectrum efficiency and improved link availability, particularly in wireless (e.g., microwave) links. One of the disadvantages of changing the modulation level is that this changes the throughput of the wireless (e.g., microwave) link. While discussion herein is directed to microwave communication, it will be appreciated that at least some embodiments and discussions herein may be applied to any wireless (e.g., radio frequency (RF)) communication).

Figure 2:
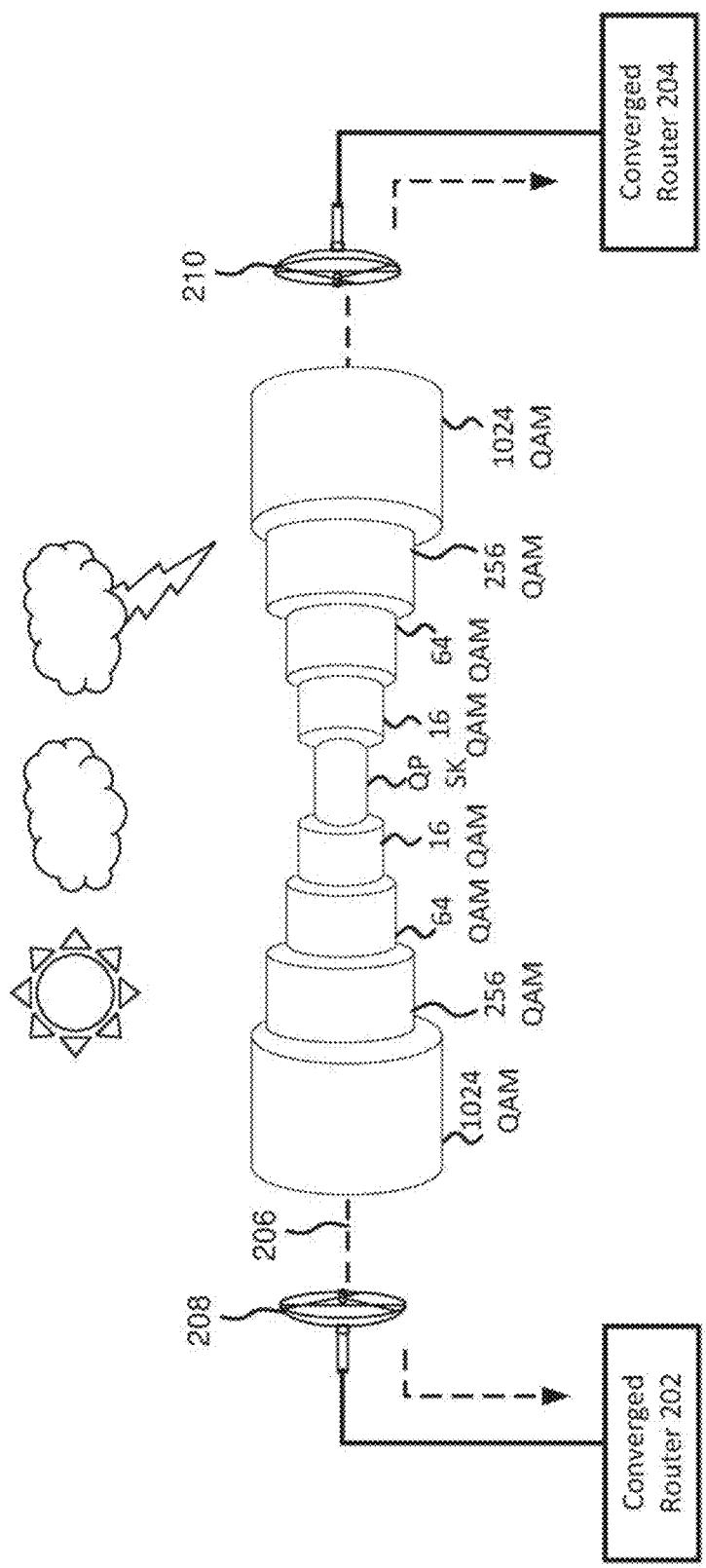
FIG. 2 is an example air frame structure in some embodiments.

FIG. 2 depicts two example converged microwave routers 202 and 204 under a single variable link 206, where the link capacity is changing dynamically. In this example, the microwave routers 202 and 204 communicate data over a single link 206 over a microwave network via microwave antennas (e.g., dishes) 208 and 210.

It will be appreciated that the modulation of the microwave network may dynamically change based on changing conditions between the two microwave antennas 208 and 210 (e.g., Adaptive Coding and Modulation (ACM)). Modulation changes may be related to impact of weather on the wireless link. In some examples, when sunny and dry, data may be transmitted and received using a modulation scheme of 1024 QAM. When partially sunny and some humidity, the modulation scheme may change to 256 QAM. Under light rain conditions, the modulation scheme may change to 64 QAM. In snow and/or ice conditions, the modulation scheme may change to 16 QAM. Under heavy rains and humidity, the modulation scheme may change to QPSK.

A traditional router that is not configured or capable of adaptive media awareness or routing data with variable bandwidth, much less using link aggregation techniques.

Figure 3:
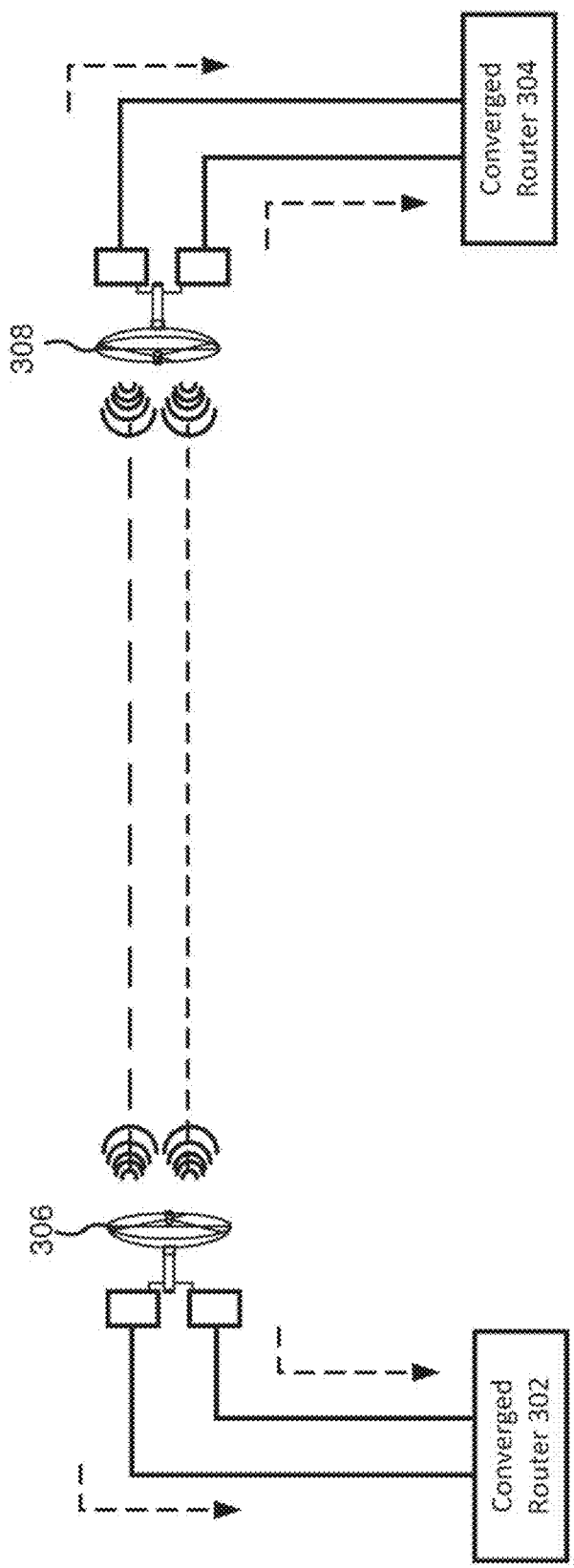
FIG. 3 depicts two example converged microwave routers 302 and 304 communicating over a microwave channel using multiple links in some embodiments.

FIG. 3 depicts two example converged microwave routers 302 and 304 communicating over a microwave channel using multiple links in some embodiments. Converged router 302 is in communication with antenna 306. In this example, there are two links in communication with antenna 306. Similarly, converged router 304 is in communication with antenna 308. There are two links in communication with antenna 308. The converged router 302 and converged router 304 may be converged microwave routers.

For increased bandwidth, load balancing and availability of communication channels between nodes (e.g., switches and stations), networks (e.g., converged routers 302 and 304) may use link aggregation techniques to combine multiple links into a single logical link (sometimes referred to as a "link aggregation group" or "LAG"). Link aggregation techniques are designed to achieve increased bandwidth and provide redundancy to support individual link failures. When one link fails, the link aggregation system redistributes the traffic across the remaining links. When a failed link recovers, the system redistributes the traffic to include the recovered link.

Link aggregation may use information from the packet headers at different network layers to distribute traffic. At layer 2, traditional systems determine which outgoing port to use by hashing destination and source MAC addresses. At layer 3, traditional systems determine which outgoing port to use by hashing fields of the IP header, most commonly the source and destination IP address. Because these methods depend on the traffic flow characteristic and patterns of the payload, traditional systems using layer 2 or layer 3 have proven less than effective. For example, in point-to-point systems, which have only one source and one destination MAC address, traditional hashing algorithms will not have MAC address diversity to distribute the traffic over multiple physical links, because the hashing of the source and destination MAC addresses will always result in the same outgoing port. Therefore, the traditional systems will funnel all traffic over only one physical link. A layer 3 system will produce better results, due to a larger diversity of IP addresses in the payload. However, the layer 3 hashing algorithm will not achieve effective load balancing.

Further, in wireless (e.g., microwave) communication, IEEE 802.1AX does not effectively support link aggregation. IEEE 802.1AX demands that each link provide identical capacity. IEEE 802.1AX fails to accommodate the inherently inconsistent radio link capacities of wireless links. Further, IEEE 802.1AX demands that each physical link provide unchanging capacity. IEEE 802.1AX fails to accommodate the inherently dynamic radio bandwidth changes of wireless links. Accordingly, IEEE 802.1AX does not efficiently support wireless link aggregation.

Aviat Networks solved some of these problems with a layer one link aggregation (L1LA) technique, as described in U.S. Pat. No. 8,264,953 and in U.S. Pat. No. 9,125,084, which is hereby incorporated by reference. As described, wireless links may be aggregated. Using layer one link aggregation, Aviat Networks developed a technique of layer one rapid channel failure detection and recovery and improved capacity over wireless links.

Using L1LA, wireless links may be bundled to form a single virtual channel. Because L1LA uses virtual containers to distribute traffic across the links, traffic may be distributed across the link based on link capacities. Unlike IEEE 802.1AX, the link capacity of each wireless link need not be identical. L1LA may perform automatic capacity adjustments to compensate for the adaptive conditions present in wireless links, e.g., when using adaptive modulation. As wireless link capacities changes, traffic may be distributed accordingly. If one wireless link fails, traffic may be distributed to the remaining wireless links. If one wireless link recovers, traffic may be distributed to the recovered link. Because L1LA detects failures using layer one information, enterprises such as mobile wireless carriers, data access providers, and fixed wireless carriers, as well as enterprises and government institutions that operate broadband wireless networks can enjoy carrier-class infrastructure for handling their IP communications and mission critical applications.

Figure 4:
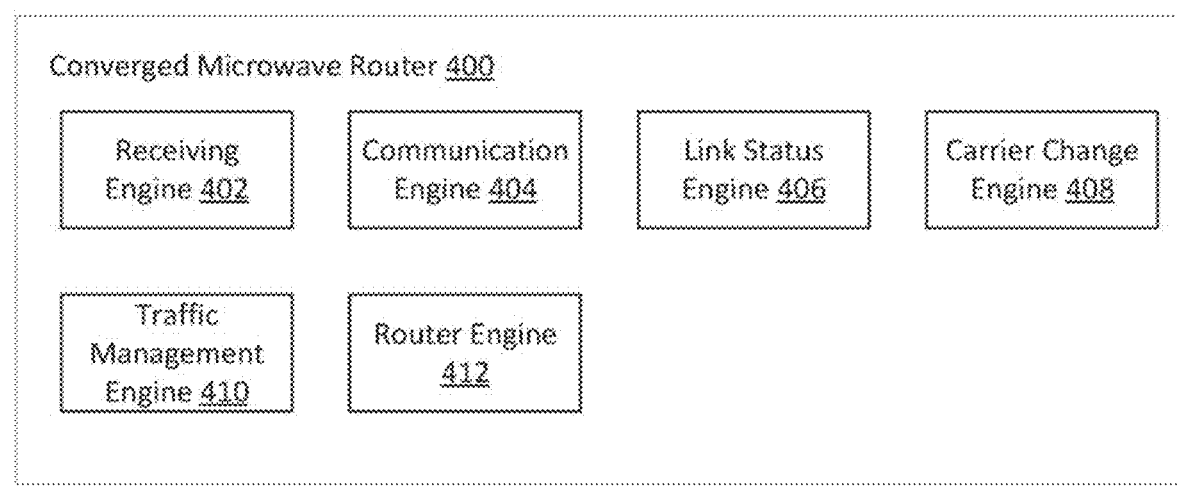
FIG. 4 depicts a converged microwave router in some embodiments.

FIG. 4 depicts a converged microwave router 400 in some embodiments. In some embodiments, the converged microwave router 400 may utilize Multiprotocol Label Switching (MPLS). MPLS may utilize the Resource ReSerVation Protocol (RSVP). RSVP is a signaling protocol that assists with bandwidth allocation and traffic engineering across all or parts of a network. RSVP may utilize discovery messages and advertisements to exchange label-switched path (LSP) path information between hosts. RSVP may utilize a combination of the Constrained Shortest Path First (CSPF) algorithm and Explicit Route Objects (EROS) to determine how traffic is routed through the network. The converged microwave router 400 may be, include, or be coupled to the transceivers 102 and/or 104 of FIG. 1 (e.g., different converged microwave routers may be, include, or be coupled to the transceivers). Similarly, the converged microwave router 400 may be, include, or be coupled to the microwave routers 202 and/or 204 in FIG. 2 (e.g., different converged microwave routers may be, include, or be coupled to the microwave routers). Further, the converged microwave router 400 may be, include, or be coupled to the converged routers 302 and 304.

The converged microwave router 400 may include a receiving engine 402, communication engine 404, a link status engine 406, a carrier change engine 408, a traffic management engine 410, and a router engine 412. The converged microwave router may integrate router and microwave communications together. In some embodiments this is performed through an internal ethernet messaging system to rapidly communicate dynamic media information from a routers upper layers (e.g. L3/MPLS protocols) to indicate time critical information about radio links.

The receiving engine 402 may be configured to receive network data from wired and unwired sources. For example, the converged microwave router 400 may receive frame traffic from another converged microwave router across the microwave wireless link. Further, the converged microwave router 400 may receive and/or transmit data to other digital devices across other wired links (e.g., receiving data over wired link from a data source to transmit across the microwave channel to the other converged microwave router and vice versa).

The communication engine 404 may be configured to retrieve information received from other devices across network links. The information may include, but not be limited to, status of network links, changes in the carrier, traffic management information, and/or the like.

In various embodiments, transmission over a microwave link may be based on a continuous synchronous transmission of air frames separated by a preamble. In some embodiments, every air frame that transmits over a wireless link (e.g., the microwave channel) starts with the preamble which may be a sequence known to the receiver (e.g., another converged microwave router or receiver). The preamble may be followed by an Air Frame Link Control field which may contain control information defining the air frame. In various embodiments, the preamble and the air frame link control field are followed by blocks of QAM (or QPSK) symbols, called transport blocks (TB). Transport blocks may be containers for user data (e.g., Ethernet packets, TDM Payload, or the like) and other required control data (e.g., ACM, ATPC, AGC, control loops, or the like) exchanged mutually by microwave modems.

The size of those containers may depend on the current Adaptive Coding Modulation (ACM) state and on the configured framing choice. Adaptive coding modulation allows dynamic change of modulation and FEC level to accommodate for radio path fading which is typically due to weather changes on a transmission path. Benefits of ACM may include improved spectrum efficiency and improved link availability, particularly in wireless (e.g., microwave) links.

In various embodiments, the communication engine 404 may retrieve information from frames received over the microwave channel or assist in creating frames for transmission. In various embodiments the converged microwave router 400 routes data based at least in part on information received from the communication engine (e.g., a change in modulation information contained in a received airframe that may impact bandwidth of the microwave channel).

Similarly, the communication engine 404 may transmit information within frames over the microwave channel. The information within the frames may indicate radio link status, bandwidth capacity changes, L1LA carrier changes, link channel capacity, and the like. In some embodiments, the converged microwave router 400, a modem, and/or a transceiver determines the information to be placed within a frame and transmits the frame. Similarly, in some embodiments, the converged microwave router, a modem, and or a transceiver receives information from within a frame received over a microwave channel.

In various embodiments, the converged microwave router is able, via internal Ethernet message(s), to rapidly communicate dynamic media information from RF unit (e.g., transceiver) to the router's upper layers (e.g., L3/MPLS protocols), to indicate or receive time critical information about radio link, such as, but not limited to:
  radio link status (up/down),
  radio transmitted capacity (bandwidth) due to ACM modulation change, L1LA carrier change, or any kind of link aggregation member carrier change, and/or
  Maximum ACM, L1LA or LAG (Link Aggregation Group) channel capacity (bandwidth) etc.

In various embodiments, the link status engine 406 may be configured to determine a link status of the wireless link and/or link status of individual links of a link aggregation group based on information contained within a frame received from another converged microwave router. In some embodiments, the communication engine 404 may receive information and/or evaluate one or more links in the wireless channel to determine the status of the wireless channel or links within the wireless channel. Subsequently, the link status engine 406 may evaluate the status of the channel/link(s) and update radio link status information within the converged microwave router 400 and/or provide the radio link status information to an LSP head end (for traffic management), another converged microwave router over the wireless channel, and/or an LSP tail end (as well as any other digital device related to the network that may utilize the link information).

The carrier change engine 408 may be configured to determine a change in modulation of frames that are transmitted over the wireless channel. In various embodiments, information regarding changes of modulation may be received from another converged microwave router on the other side of a wireless channel. This information may be contained in the preamble of the frame as discussed herein. In some embodiments, the communication engine 404 may evaluate the channel for fading conditions or other disruptive occurrences which may require a change in modulation (e.g., from 1024 QAM to 256 QAM). This modulation change may negatively impact the bandwidth of the channel. Similarly, in some embodiments, the communications engine 404 may evaluate the channel for improving conditions which may require a change in modulation which may improve bandwidth.

Some embodiments, the traffic management engine 410 may utilize an Interior Gateway Protocol (IGP) and traffic engineering (TE) extension for traffic management. In some embodiments, the traffic management engine 410 may control traffic management by utilizing dynamic RSVP-TE bandwidth control to ensure that with new bandwidth, original reservation(s) on that link is still valid, and that any excess bandwidth LSPs may be preempted, and rerouted according to their priority.

IGP such as OSPF (Open Shortest Path First) and IS-IS (Intermediate Subsystem to Intermediate Subsystem), may use the link metric as inversely proportional to the link bandwidth:

$$\text{Link Metric}=100{,}000{,}000/\text{Bandwidth in } bps$$

In various embodiments, the converged microwave router may report bandwidth to be used as a metric avoiding need for complex configuration tasks which need to be updated as capacity is added. In some embodiments, a user may select auto-cost mode to enable reporting of bandwidth to be used as the metric. Changing link bandwidths could trigger OSPF LSA (Link-State Advertisement) or IS-IS LSP (Link-State Packet) update, and hence cause rerouting while changing link status may trigger adjacency and reachability updates, thus causing possible rerouting by the router engine 412.

The traffic management engine 410 may use the following bandwidth related sub-TLVs, (e.g., in a frame) which may be dynamically populated and updated by messaging:
  Maximum Bandwidth: This sub-TLV may contain a physical maximum bandwidth that can be used on this link in this direction. This sub-TLV can be mapped to AMA field "Maximum Capacity".
  Maximum Reservable Bandwidth: This sub-TLV may contain a maximum amount of bandwidth that can be reserved in this direction on this link. For oversubscription purposes, this can be greater than the maximum bandwidth of the link. This sub-TLV can be mapped to AMA field "Current Transmitted Capacity".
  Unreserved Bandwidth: This sub-TLV may contain an amount of bandwidth available in this direction on this link. This sub-TLV is a result of RSVP reservation.

$$\text{Unreserved Bandwidth}=\text{Maximum Reservable Bandwidth}-\text{Reserved Bandwidth}$$

The traffic management engine 410 may maintain a traffic-engineering database (TED), but the current available bandwidth on the TE link may come from RSVP admission control. When a link bandwidth related sub-TLV changes, the traffic management engine 410 may use LSA or LSP opaque information to inform its neighbor routers. After IGP TED convergence time, all (or some) network routers may know the bandwidth available on all TE links and Constrained Shortest Path First (CSPF) can be computed.

However, IGP updates can consume excessive system resources. For stability reasons, depending on number of nodes in a network, sometimes it is not desirable to perform an IGP update for every change in bandwidth. In some embodiments, one or more converged microwave routers may report changes in bandwidth when the change in bandwidth is above a predetermined threshold, when rerouting of data is required, and/or at periodic intervals of time. Will be appreciated that there may be many ways to determine when to send IGP updates.

Because of this temporary mismatch or outdated bandwidth information on TE link, RSVP may attempt to establish an LSP over a path with insufficient bandwidth. When this happens, RSVP triggers an IGP TED update and CSPF can recomputed the path.

This problem is more serious for ACM or link aggregation links. RSVP TE admission and policy control (bandwidth reservation and preemption) of a converged microwave router may utilize the concept of setup priority and hold priority of LSP:

Setup Priority. Determines whether a new LSP can preempt an existing LSP during session establishment. If no sufficient bandwidth is available to support the new LSP, the setup priority is compared with the hold priority of existing LSPs to determine if preemption is applicable.

Hold Priority. Determines the degree to which an LSP holds on to its session reservation after the LSP has been set up successfully. When the hold priority is high, the existing LSP is less likely to give up its reservation, and hence it is unlikely that the LSP can be preempted.

The router engine 412 may route data over wired and wireless connections. In various embodiments, the router engine 412 may make determinations on whether to preempt an LSP or make changes to data flows based on changes in ACM or any other reason. In various embodiments the router engine 412 may make a determination to make changes and LSP and, as a result, make recommendations or indicate preemptions or rejections of LSP's (e.g., to provide to the LSP head end).

In one example, LSP setup and hold priorities are specified in eight priorities: 0-7 (0 for highest priority, 7 for lowest priority). Below is an example of RSVP TE bandwidth reservation table on a converged microwave router for a TE Link with a fixed bandwidth 100 (Mbps).

Figure 5A:
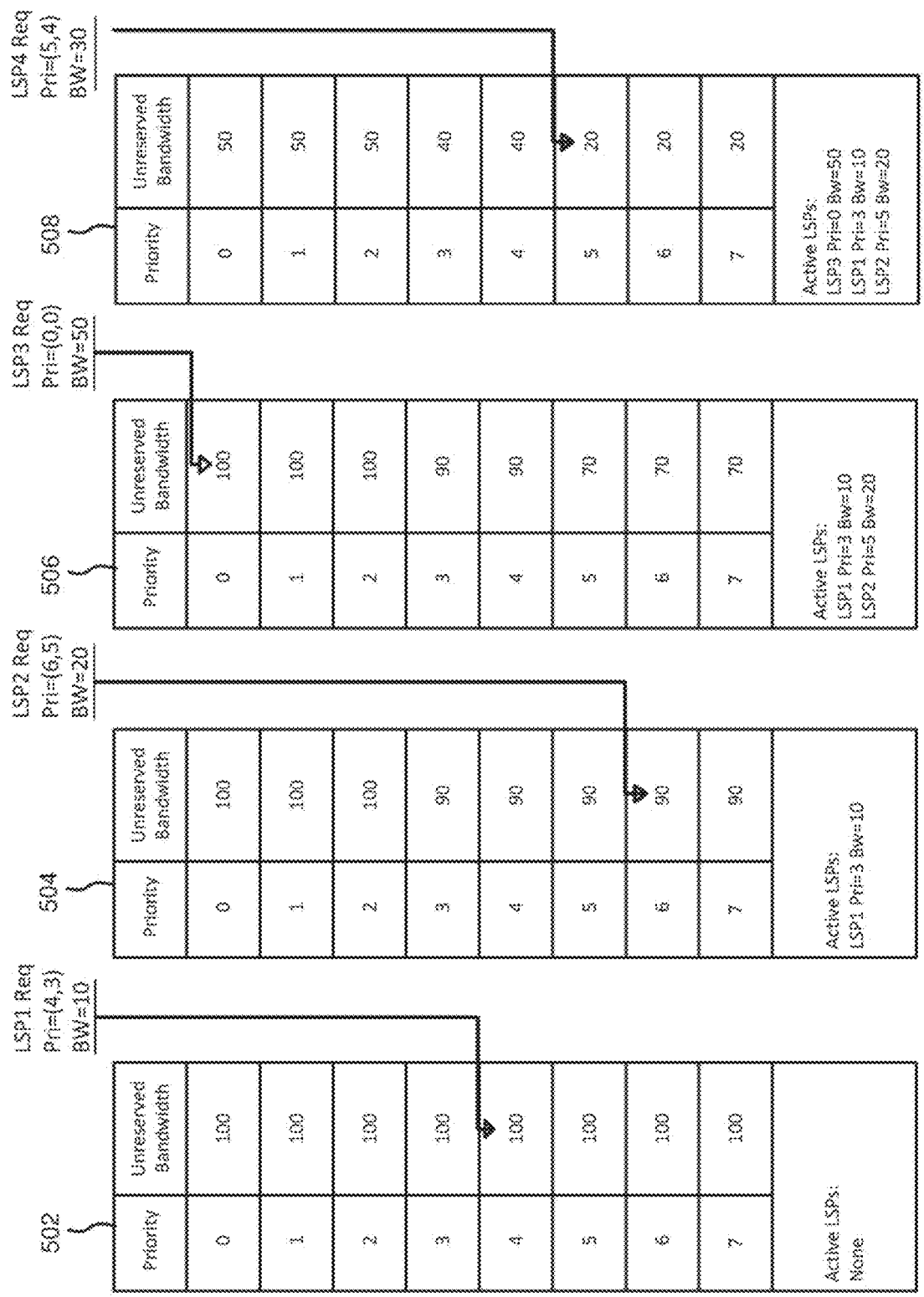

FIGS. 5a and 5b depict a process of controlling LSP over a microwave wireless link between two converged microwave routers in some embodiments. This example shows the admission control and preemption made for each LSP requested. RSVP table 502 indicates priority levels of 0 through 7 and unreserved bandwidth of 100 Mbps. The 100 Mbps is allocated across the 8 levels of priority. RSVP table 502 indicates there are no active LSP's.

In this example, a first LSP request, titled LSP1, is received by the converged microwave router. The LSP1 request indicates priority of (4, 3) meaning a setup priority of 4 and a hold priority of 3. The LSP1 request also requests 10 Mbps of bandwidth. RSVP table 504 shows the impact of the LSP1 request. RSVP table 504 shows that priority levels 3 through 7 have unreserved bandwidth of 90 Mbps while there is still unreserved bandwidth of 100 and priority 0 through 2. This is because if priority requests of priority levels 0 through 2 is received, some or all the routing related to the LSP1 request may be preempted or changed (depending on the bandwidth requested. Similarly, if there is a change of bandwidth, priority levels of LSP requests may determine which (if any) of the bandwidth reservations must be preempted.

RSVP table 504 shows a LSP2 request being received. The LSP2 request includes a priority of (6,5) (i.e., a setup priority of 6 and a hold priority of 5). The LSP2 request further requests bandwidth of 20 Mbps.

RSVP table 506 shows the results of the LSP1 and LSP2 requests. For example, RSVP table 506 shows unreserved bandwidth of 100 Mbps for priority level 0 through 2, unreserved bandwidth of 90 Mbps for priority levels 3 and 4, and unreserved bandwidth of 70 Mbps for priority levels 5 through 7.

RSVP table 506 further shows that a third LSP request, LSP3, is received. The LSP3 request indicates a priority of (0,0) (i.e., a setup priority of 0 and a hold priority of 0) for bandwidth of 50 Mpbs. LSP requests 1 through 3 may be handled with the bandwidth available.

RSVP table 508 shows that, after reserving bandwidth for LSP requests 1 through 3, priority levels 0 through 2 have an unreserved bandwidth of 50 Mbps, priority levels 3 and 4 have an unreserved bandwidth of 40 Mbps, and priority levels 5 through 7 have an unreserved bandwidth of 20 Mbps.

RSVP table 508 further shows that a fourth LSP request, LSP4, is received. The LSP4 request indicates a priority of (5,4) (i.e., a setup priority of 5 and a hold priority of 4) for bandwidth of 30 Mbps. This request will require the converged microwave router (or the LSP head end router) to make decisions regarding traffic management based on these LSP requests. The converged microwave router may make recommendations to provide to an LSP head end and or make changes in traffic flow based on the setup priority and the hold priority of the LSP requests.

In this example, the setup priority of 5 for the LSP4 request determines whether the new LSP can preempt an existing LSP. Previously received LSP requests include a hold priority which determines the degree to which an LSP holds onto its session reservation after the LSP has been set up successfully. In the examples of FIGS. 5a and 5b, each LSP requests includes a different hold priority than a set of priority indicating that once a session is created, there is a weighting to maintain the session above the set of priority. It will be appreciated that the setup priority and the hold priority of any LSP request may be the same or different (e.g., higher or lower).

In this case, the converged microwave router or the LSP head end router may reject the LSP4 request based on its priority level in comparison to previously received LSP requests. In this example, LSP4 has a setup priority that may be the same as LSP2. The converged microwave router or the LSP head end router may be configured to maintain previously received LSP requests if the hold priority is the same as a new LSP request's setup a priority. In various embodiments, the converged microwave router or the LSP head end router may be configured to reject previously received LSP requests if the hold priority is the same as a new LSP requests setup priority.

RSVP table 510 shows that the LSP4 request was rejected and, as such, the unreserved bandwidth for all previous priority levels remains unchanged. RSVP table 510 further shows that fifth LSP request, LSPS, is received. The LSPS request indicates a priority of (4,2) (i.e., a setup priority of 4 and a hold priority of 2) for bandwidth of 30 Mbps. This request will also require the converged microwave router or the LSP head end router to make decisions regarding traffic management based on these LSP requests. The converged microwave router may make recommendations to provide to an LSP head end and or make changes in traffic flow based on the setup priority and the hold priority of the LSP requests.

Unlike the previous LSP request, the LSPS request preempts the previously received LSP2 request. In this example, the converged microwave router may preempt the LSP2 request in favor of the LSPS request (i.e., because of the setup and hold priorities of the LSPS request and the LSP2 request). As a result, the bandwidth that was previously reserved for the LSP2 request is returned and bandwidth is reserved for the LSPS request.

RSVP table 512 shows the results of the reservation of bandwidth related to the LSP3 request, the LSPS request, and the LSP1 request. In this case, priority levels 0 and 1 have unreserved bandwidth of 50 Mbps, priority level 2 have unreserved bandwidth of 20 Mbps, while party levels 3 through 7 of unreserved bandwidth of 10 Mbps.

Figure 6:
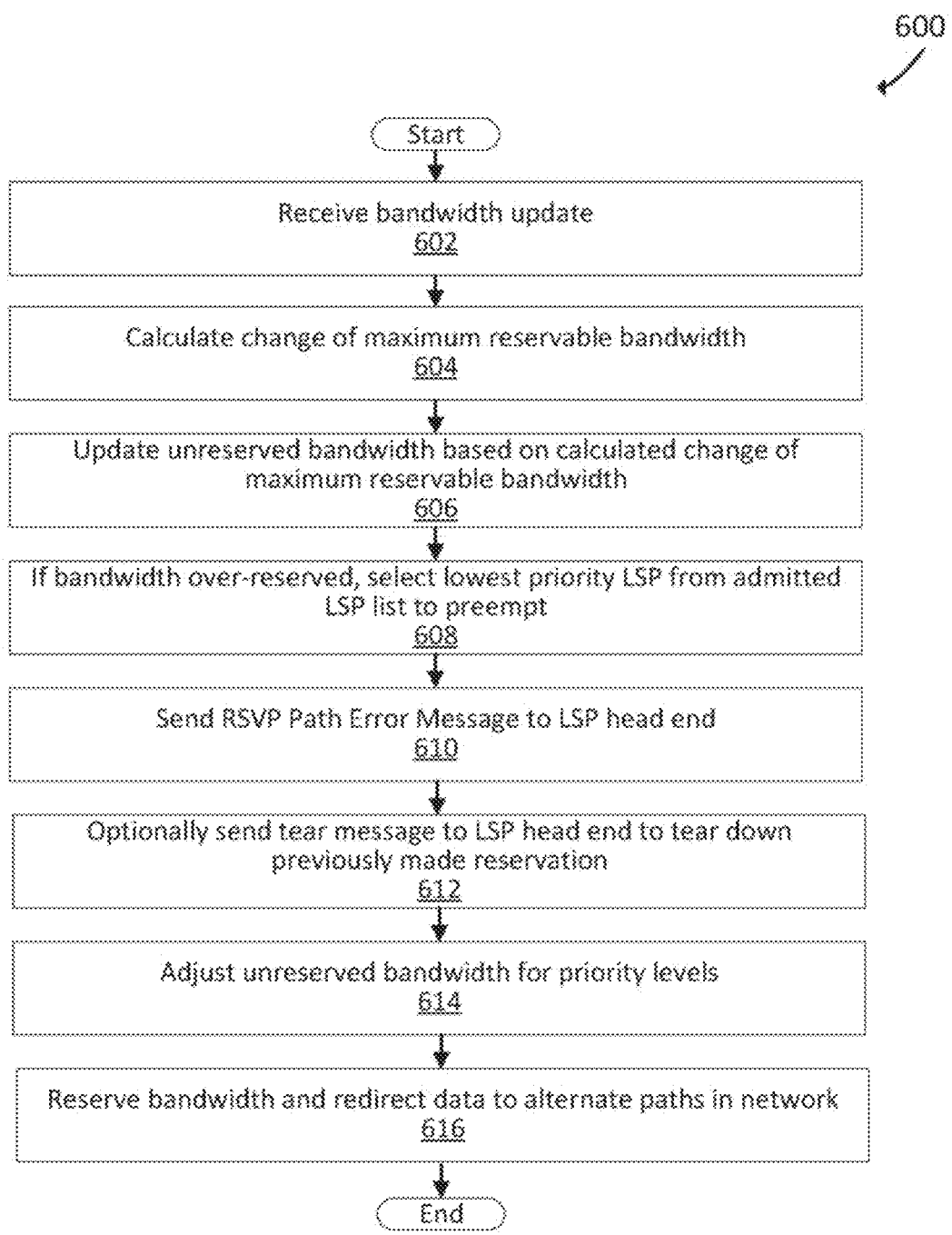
FIG. 6 depicts a flow chart for changing reserved bandwidth on a wireless path with changing bandwidth.

FIG. 6 depicts a flow chart for changing reserved bandwidth on a wireless path with changing bandwidth. In various embodiments, one or more converged microwave routers may provide fast information about bandwidth and channel status change of the microwave links. A converged microwave router (e.g., IP/MPLS router) may use this information to update automatically the RSVP reservation table after bandwidth change. Lower priority LSPs may be pre-empted if bandwidth reserved previously exceeds the new maximum reservable bandwidth. Pre-empted LSP headends may be notified (e.g., through RSVP PATH Error message) and rerouted to other links with sufficient bandwidth (if those exist).

Embodiments discussed herein may assist in dynamically rerouting of traffic flows according to current channel capacity.

Figure 7:
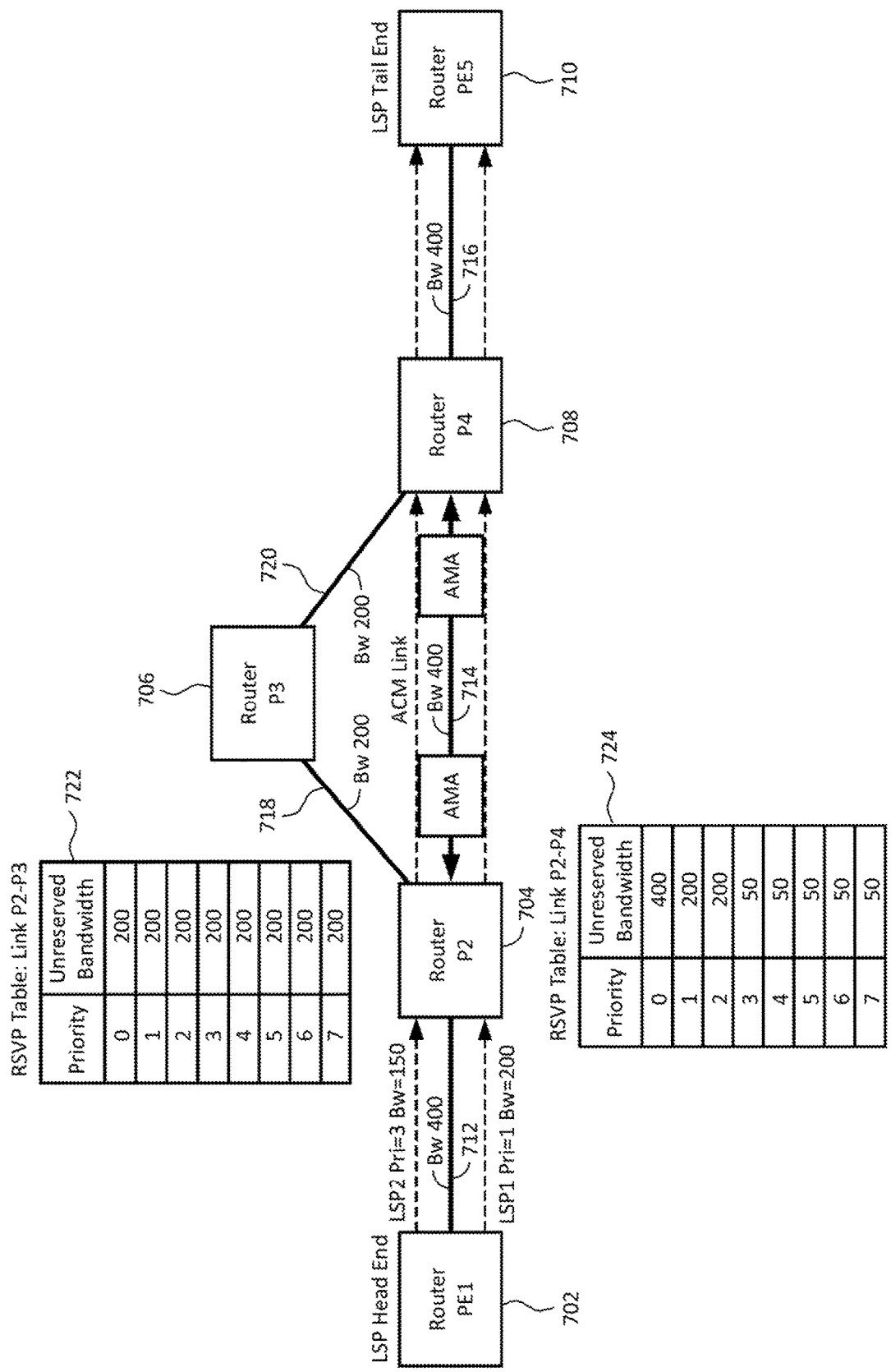
FIG. 7 depicts an example LSP head end router in communication with LSP tail end router.
Figure 8:
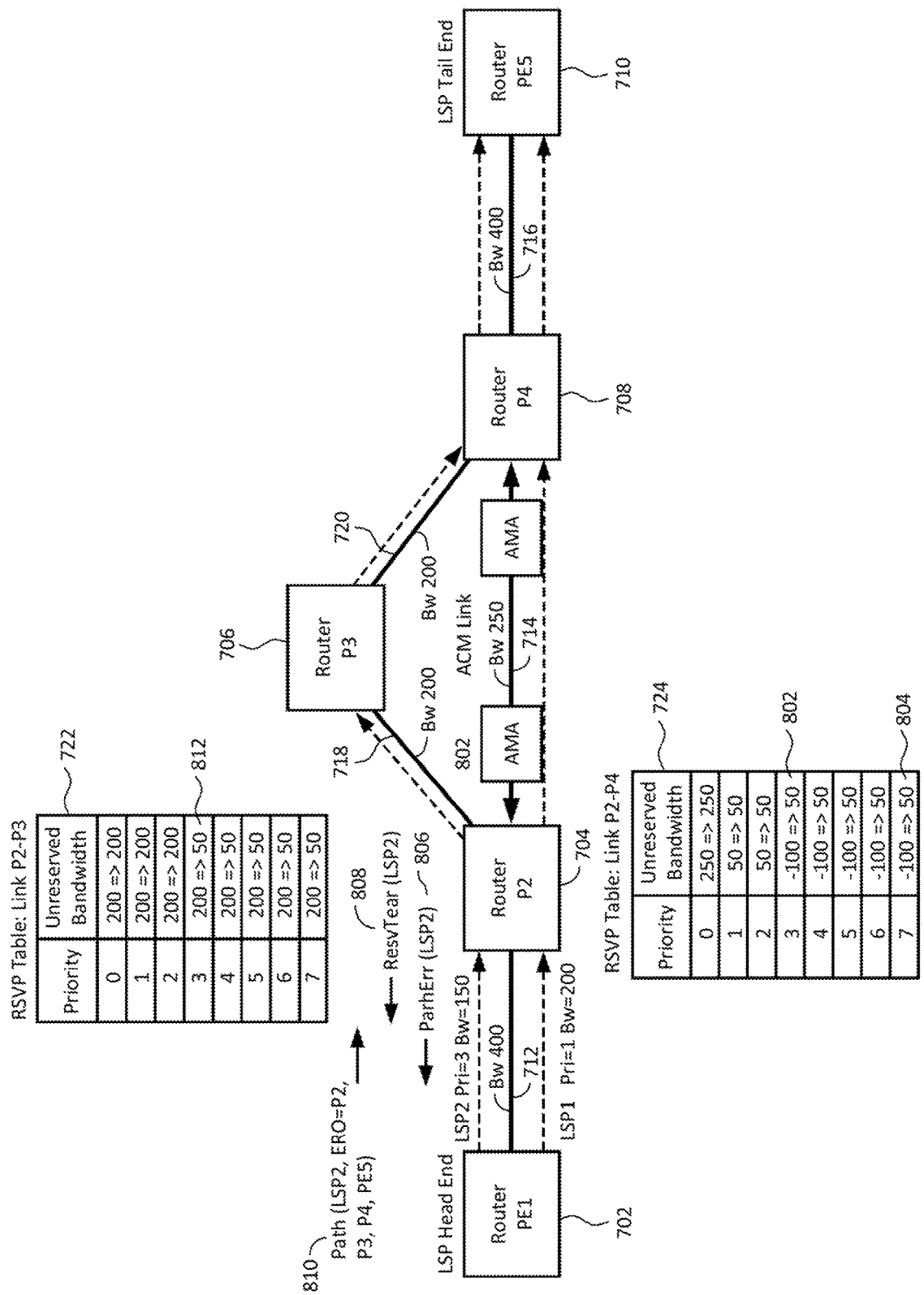
FIG. 8 depicts a change in bandwidth caused by dynamic coding modulation of the wireless link in an example.

The flowchart of FIG. 6 is discussed in the context of system diagrams in FIGS. 7 and 8. FIG. 7 depicts an example network including a router at an LSP head end and a router at an LSP tail end with two paths in the network including a wireless path between two converged microwave routers and a wired path between the two converged microwave routers via a fourth router. FIG. 8 depicts a process whereby changes in ACM affect bandwidth in the network depicted in FIG. 7 and the subsequent changes in network traffic routing in some embodiments.

FIG. 7 depicts an example LSP head end router 702 in communication with LSP tail end router 710. LSP head end router 702 communicates over a wired network to converged microwave router 704. In this example, the bandwidth between the LSP head end router 702 and converged microwave router 704 is 400 Mbps. Converged microwave router 704 is in wired communication with router 706 as well as overall a microwave wireless link with converged microwave router 708. Converged microwave router 708 is in wired connection with router 706 as well as with LSP tail end router 710.

In this particular embodiment, as depicted in FIG. 7, the LSP head end 702 may route data through 2 paths to the LSP tail end router 710. One path includes all wired links while the other path includes one wireless link between converged routers 704 and 708. For example, one path extends from LSP head end router 702 over wired link 712 to converged microwave router 704, from converged microwave router 704 over the wired link 718 to router 706, from router 706 over the wired link 720 to converged microwave router 708, and from converged microwave router 708 over the wired link 716 to LSP tail end router 710. Another path extends from LSP head end router 702 over wired link 712 to converged microwave router 704, from converged microwave router 704 over wireless link 714 to converged wireless router 708, and from converged wireless router 708 over wired link 716 to LSP tail end router 710.

At the time of FIG. 7, the bandwidth of wired link 712 is 400 Mbps, the bandwidth of wireless link 714 is 400 Mbps, the bandwidth of wired link 716 is 400 Mbps, the bandwidth of wired link 718 is 200 Mbps, and the bandwidth of wired link 720 is 200 Mbps.

FIG. 8 depicts a change in bandwidth caused by dynamic coding modulation of the wireless link 714 in an example. The change in bandwidth of the wireless link 714 results in a change in the data flow from the LSP head end router 702 to the LSP tail end router 710. In the examples shown in FIGS. 7 and 8, it will be appreciated of the impact that ACM may have on a wireless link (e.g., microwave wireless link).

While FIG. 7 depicts LSP head end router 702 transmitting information to LSP tail end router 710, it will be appreciated that data may be sent backwards or forwards between routers 702 and 710 across the network links. Similarly, converged microwave routers 704 and 708 may receive and provide data between any LSP head ends to any LSP tail ends, not just those depicted in FIG. 7. In a similar manner, router 706 may be a part of the path of data transmission to and from any source and destination.

Returning to the example flowchart in FIG. 6, the converged microwave router utilizes the RSVP-TE dynamic bandwidth control. This approach may utilize standard RSVP messages and may be interoperable, in some embodiments, with any standard MPLS routers that support RSVP-TE.

In various embodiments, the method depicted in FIG. 6 may assume availability of two basic parameters for the RSVP TE link:

Current unreserved bandwidth per priority (0-7).
List of actual admitted LSPs for the TE link.

The method depicted for FIG. 6 relates to the state depicted in the example of FIG. 7. In FIG. 7, two LSP requests have been provided from the LSP head end 702 to transmit information across the network to LSP tail end 710. LSP1 is for priority 1 and requests to reserve a bandwidth of 200 Mbps. LSP2 is for priority 3 and a request to reserve a bandwidth of 150 Mbps. Although FIGS. 7 and 8 depict priorities as single values, it will be appreciated that the LSP requests may include set up priorities and hold priorities, as discussed herein. Similarly, the LSP request may include any number of priority levels (e.g., not just limited to set up and hold priorities) to assist in traffic management.

As depicted in FIG. 7, the microwave link 714 has a bandwidth of 400 Mbps which is similar to the bandwidth between the LSP head end router 702 and the converged microwave router 704 as well as between converged microwave router 708 and LSP tail end router 710. The wired bandwidth between converged microwave router 704 and router 706 is 200 Mbps. Similarly, the bandwidth between router 706 and converged microwave router 708 is also 200 Mbps.

As depicted in FIG. 7, bandwidth for LSP1 and LSP2 is reserved across the microwave channel as shown by RSVP table 724. RSVP table 724 shows priority levels 0 through 7 with priority 0 having an unreserve bandwidth of 400 Mbps, priority levels 1 and 2 having unreserved bandwidth levels of 200 Mbps, and priority levels 3 through 7 having unreserved bandwidth of 50 Mbps. RSVP table 722 shows that no bandwidth has been reserved between converged router 704 and router 706. RSVP table 722 shows priority levels 0 through 7 each with an unreserved bandwidth of 200 Mbps.

In step 602, the converged microwave router 704 receives a bandwidth update on a TE link from another converged microwave router 710 (due to ACM or Link Aggregation capacity change). In various embodiments, the communication engine 404 may retrieve the information regarding the bandwidth update from information received from the other converged microwave router (e.g., from an airframe received over the wireless channel).

In step 604, the traffic management engine 410 of the converged microwave router 704 may calculate the change of Maximum reservable bandwidth. The change can be positive if bandwidth increased, or negative if bandwidth reduced. Whenever a change on maximum reservable bandwidth happens, the method may continue to the next step. Otherwise, the converged microwave router 400 may continue waiting for another change of bandwidth (e.g. Receiving a bandwidth update or detecting a change of a condition of the wireless channel that may impact bandwidth). The change may be represented as change in bandwidth=maximum reservable bandwidth in view of new request−maximum reservable bandwidth of current state.

For example, regarding FIG. 8, the converged microwave router 704 may receive AMA message 802 over microwave link 714. The AMA message 802 may have been provided from converged microwave router 708. The converged microwave router 704 may determine that, as a result of changes in the wireless channel, the wireless channel no longer has a bandwidth of 400 Mbps but rather now has an available bandwidth of 250 Mbps. This change may be result of adaptive coding modulation performed because of fading conditions related to whether and/or any other conditions that may impact dynamic modulation decisions.

In step 606, the traffic management engine 410 may update the unreserved bandwidth for all eight priorities using this TE link bandwidth change. In one example, the traffic management engine 410 may verify the reservations made previously are still valid, by checking only newly updated unreserved bandwidth of the lowest priority 7 (element 804). If unreserved bandwidth is smaller than zero (over-reserved), then the method may proceed to step 608. Otherwise, the traffic management engine 410 may rearrange bandwidth and await further indication of changes in the wireless channel. In this case, FIG. 8 shows that priority level VII has an unreserved bandwidth of −100 Mbps and therefore the method proceeds to step 608.

In step 608, the traffic management engine 410 selects the lowest (hold) priority LSP from the admitted LSP list to be preempted. In the example of FIG. 8, the converged microwave router 704 and/or the LSP head end 702 may determine that LSP2 (with a priority of three) has a lower priority than LSP1 with a priority of 1.

In step 610, the traffic management engine 410 sends an RSVP Path Error message 806 to the LSP head end 702. The RSVP Path error message may include any number of error codes (e.g., Error code 2 for "Policy Control Failure," and Error value 5 for "Flow was preempted"). In the example of FIG. 8, the converged microwave router 704 may send Path error message 806 to LSP head and 702.

In step 612, the traffic management engine 410 may optionally send an RESV Tear message 808 toward the LSP head end 702, in order to tear-down the reservation made previously. The converged microwave router 704 may sent Path error message 808 to LSP head and 702. In various embodiments, the path error message 806 and/or the tear message 808 may indicate or recommend that LSP2 be preempted as a result of the changes in bandwidth of the microwave channel. In some embodiments the LSP head and 702 may determine routing for data related to LSP2.

The LSP head-end 702 may generate and transmit a PATH Tear message 808 later to all routers along the original LSP path.

In step 614, after preempting that LSP administratively (Policy Control), the LSP head end 702 and/or the converged microwave router 704 may adjust unreserved bandwidth for priorities below the preempted LSP hold priority, using the LSP bandwidth requested. The LSP head end 702 and/or the converged microwave router 704 may remove the preempted LSP from the admitted LSP list. In some embodiments, the LSP head end 702 and/or the converged microwave router 704 may confirm or determine if the TE link is still over-reserved (e.g., to see if modulation has changed and/or bandwidth of the microwave channel has been restored).

In step 616, bandwidth is reserved based on LSP preemption and redeployment and data is directed/redirected along alternate paths of the network if available. The LSP head end 702 and/or the converged microwave router 704 may reserve bandwidth along wired links 718 and 720 (e.g., between converged microwave router 704 and router 706 as well as between router 706 and converged microwave router 708). The RSVP table 722 depicted in FIG. 8 shows that, as a result of redirecting LSP2, 150 Mbps of bandwidth of priority levels 3 through 7 are reserved while priority level 0 through 2 maintain an unreserved bandwidth of 200 Mbps. Consistently, RSVP table 724 depicted in FIG. 8, shows a new bandwidth change and unreserved bandwidth of 50 Mbps of priority levels 3 through 7 (as a result of LSP2 being preempted from reserving bandwidth over the microwave channel.

Figure 9:
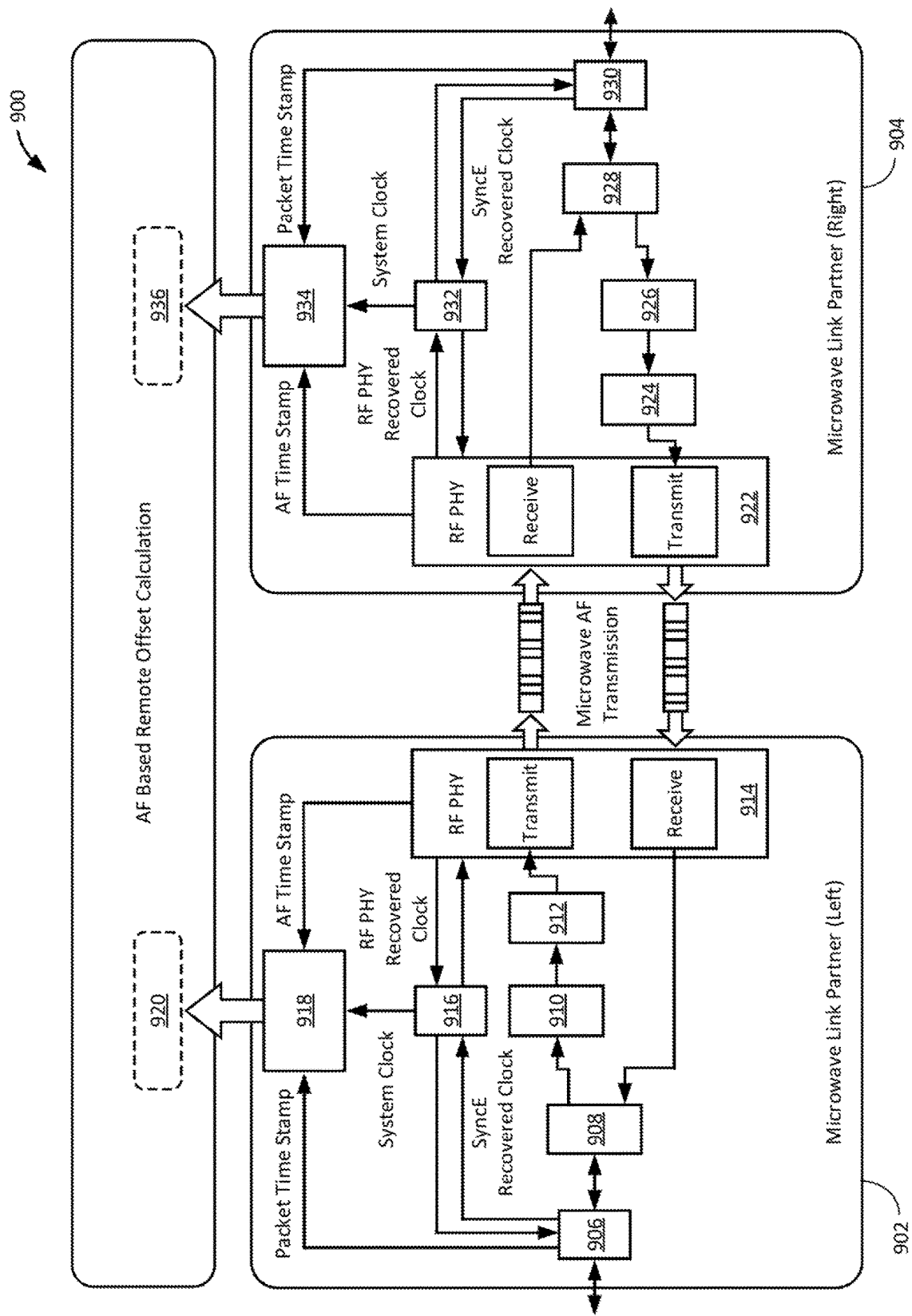
FIG. 9 depicts an environment including microwave link partners in communication over microwave channel in some embodiments.

FIG. 9 depicts an environment 900 including microwave link partners 902 and 904 in communication over microwave channel in some embodiments. The microwave link partners 902 and 904 may be or include transceivers, receivers, and transmitters. Each microwave link partners may include or be in communication with a converged microwave router. In some embodiments, the microwave link partner 302 may receive data to be transmitted over PHY 906.

The PHY 906 may be an Ethernet PHY (e.g., the data to be transmitted may be received over an ethernet cable). The PHY 906 may process and modulate the data into air frames (or any format) and provide the modulated data to the classification and routing module 908 (which may be a part of or be in communication with the converged microwave router discussed herein).

In various embodiments, systems and methods described herein utilize receiving and providing data over Ethernet cable using an Ethernet Physical Layer device (e.g., PHY 906). Packets and/or PTP packets may be received from a switch or router. In various embodiments, the PHY 906 may perform a timestamp at data ingress of the transceiver and PHY 914 may perform a timestamp at data (e.g., the airframe) egress. Similarly, the PHY 922 of the second microwave link partner 904 may timestamp when data (e.g., the airframe) is received over the microwave channel. In various embodiments, the PHY 930 may perform another timestamp at egress.

The classification and routing module 908 may direct data to be transmitted to the data packet queuing module 910 while directing data received from the radio frequency PHY 914 to the PHY 906. The data packet and queuing module 910 may control data flow (e.g., buffering and/or assist in load balancing) and provide the data to the scheduling module 912 which prepares the modulated data to be transmitted over the radio frequency PHY 914. The radio frequency PHY 914 may transmit the data to another microwave link partner (e.g., microwave link partner 904) and receive data. In various embodiments, the radio frequency PHY 914 communicates over a microwave spectrum.

It will be appreciated that the microwave link partner (e.g., 902) may down convert data (e.g., data received by a gigabit Ethernet PHY) to enable wireless transmission. The transceiver may up or down covert the data to be transmitted (e.g., to an intermediate frequency where further processing may occur and then to an RF frequency for transmission). Further, there may be elastic buffers to transfer or change the data speed to a lower seed. As a result, phase and offset are increasingly difficult to determine between devices across a wireless channel. Further, the radio may change modulation (e.g., in real-time).

The microwave link partner 904 may receive data from over the microwave channel by the radio frequency PHY 922 which may provide the received data to the classification and routing module 928 for routing and classification of the received data to the PHY 930. The PHY 930 may provide the data to another digital device via Ethernet. Similar to the microwave link partner 904, The PHY 930 of the microwave link partner 904 may be an ethernet PHY (e.g., the data to be transmitted may be received over an ethernet cable). The PHY 930 may process and modulate the data into air frames (or any format) and provide the modulated data to the classification and routing module 928. The classification and routing module 928 may direct data to be transmitted to the data packet queuing module 926. The data packet and queuing module 926 may control data flow (e.g., buffering and/or assist in load balancing) and provide the data to the scheduling module 924 which prepares the modulated data to be transmitted over the radio frequency PHY 922. The radio frequency PHY 922 may transmit the data to another microwave link partner (e.g., microwave link partner 902) and receive data. In various embodiments, the radio frequency PHY 922 communicates over a microwave spectrum.

Both microwave link partners 902 and 904 may include phase lock loops (PLLs) 916 and 922, respectively, to assist in recovery of clock signals using data received from over the wireless channel as described herein. The microwave link partners 902 and 904 may include system clocks 918 and 934, respectively, that may include different time domains.

Offset and phase synchronization module 920 may determine offset and phase synchronization for the microwave link partner 902 based on timestamps of the microwave link partners 902 and 904 as discussed herein. Similarly, offset and phase synchronization module 920 may determine offset and phase synchronization for the microwave link partner 904 based on timestamps of the microwave link partners 902 and 904 as discussed herein.

Figure 10:
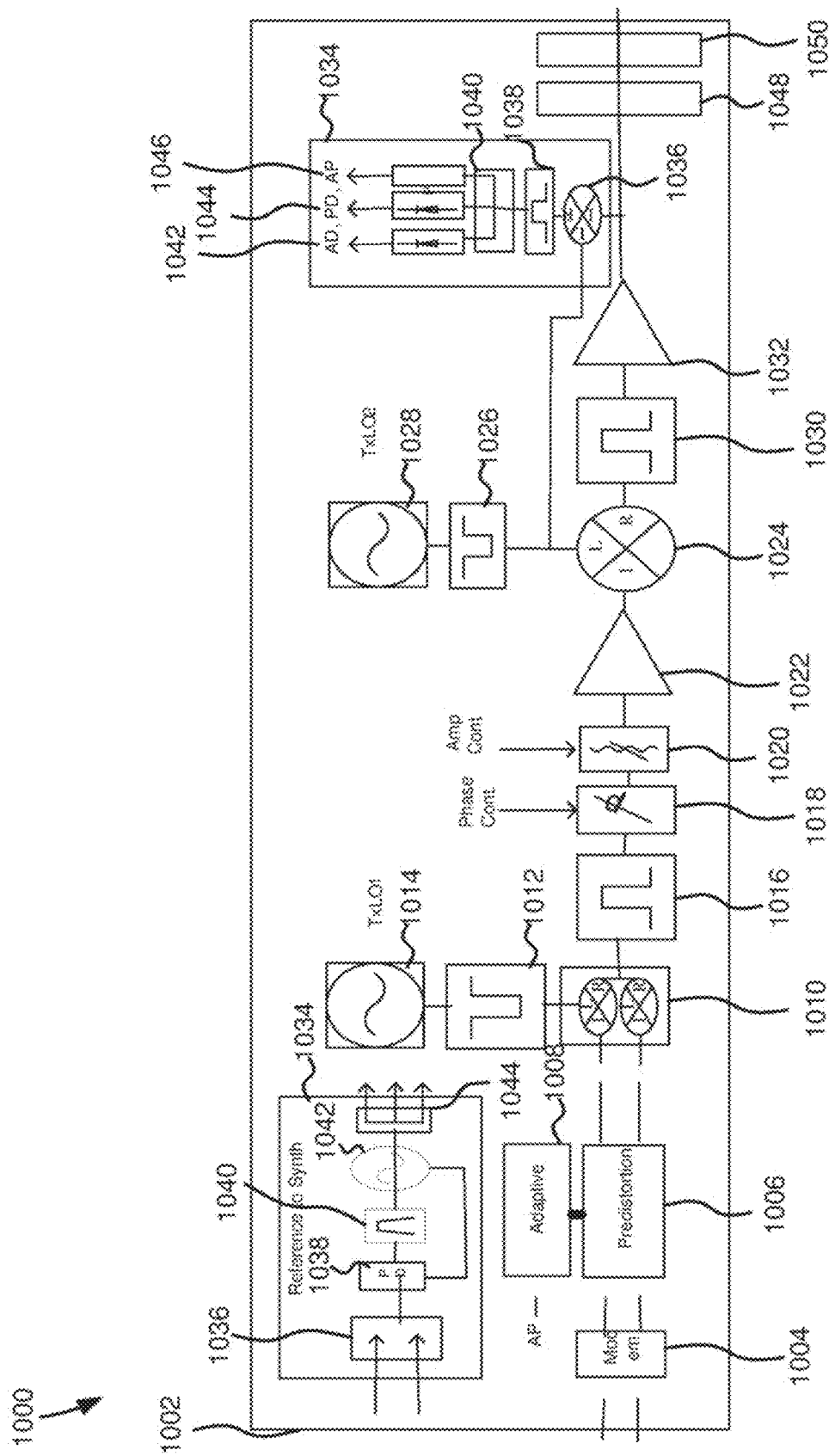
FIG. 10 depicts an example transmitting radio frequency unit in some embodiments.

FIG. 10 depicts an example transmitting radio frequency unit 1002 in some embodiments. Although a transmitter is described in FIG. 10, it will be appreciated that all or parts of the transmitter of FIG. 10 may be a part of the first transceiver 1002 as discussed herein. In some embodiments, the transmitting radio frequency unit expresses components and a logical flow of transmitting information over a wireless channel. Any transceiver including any functionality may be utilized in performing all or part of the systems and/or methods described herein.

The transmitting radio frequency unit 1002 (e.g., radio link partner 302 or radio link partner 304) may comprise a modem module 1004, a predistortion module 1006, an adaptive module 1008, mixer modules 1010 and 1024, filter modules 1012, 1016, 1026, and 1030, oscillator modules 1014 and 1028, a phase adjuster 1018, an automatic gain control (AGC) module 1020, amplification/attenuation module 1022, a power amplifier 1032, a signal quality module 1034, waveguide filter 1048, and waveguide 1060.

In some embodiments, the transceiver 1002 includes a digital signal processor (e.g., DSP). The DSP is any processor configured to provide one or more signals to the modem module 1004. The digital signal processor (DSP) may comprise a digital signal processor, or another digital device, configured to receiving a source signal intended for transmission and converting the source signal to corresponding in-phase (I) and quadrature (Q) signals. For instance, the DSP may be implemented using a digital device (e.g., a device with a processor and memory). Instructions stored on the storage system may instruct the DSP to receive an input signal from a communications network interface, convert the input signal to corresponding the in-phase (I) and quadrature (Q) signals, and provide the corresponding in-phase (I) and quadrature (Q) signals.

The modem module 1004 may be any modem configured to receive one or more signals to be transmitted. The modem module 1004, in one example, may receive an in-phase (I) and quadrature (Q) signals and provide the signals to the predistortion module 1006. The modem module 1004 may comprise a modem device, or another digital device. The modem module 1004 may be configured to receive in-phase (I) and quadrature (Q) signals and modulate the in-phase (I) and quadrature (Q) signals to encode the information.

The predistortion module 1006 may receive the signal from the modem module 1004 and improve the linearity of the signal. In various embodiments, the predistortion module 1006 inversely models gain and phase characteristics and produces a signal that is more linear and reduces distortion. In one example, "inverse distortion" is introduced to cancel non-linearity. The predistortion module 1006 may receive a predistortion control signal based on a comparison of a signal from the power amplifier 1032. In one example, the predistortion module 1006 may receive a signal based on the power amplifier 1032 in order to add distortion to an input signal to the power amplifier 1032 to cancel (e.g., non-linear) noise generated by the power amplifier 1032.

The adaptive module 1008 may provide the predistortion control signal based on the sample from the signal quality module 1034 described herein. The predistortion module 1006 may provide the I and Q signals to the mixer module 1010.

The mixer module 1010, filter module 1012, and the oscillator module 1014 may represent an upconverter configured to upconvert the signals to an intermediate frequency signal. Similarly, the mixer module 1024, filter module 1026, and oscillator module 1028 also may represent an upconverter configured to further upconvert the signal to an RF signal. Those skilled in the art will appreciate that there may be any number of upconverters configured to upconvert the signals within the transceiver radio frequency unit 1002.

The mixer modules 1010 and 1024 may comprise mixers configured to mix the signal(s) provided by the modem with one or more other signals. The mixer modules 1010 and 1024 may comprise many different types of mixers with many different electrical properties. In one example, the mixer 1010 mixes I and Q signals received from the predistortion module 1006 with the filtered oscillating signal from the filter module 1012 and the oscillator module 1014. In another example, the mixer module 1024 mixes a signal received from the amplifier/attenuator module 1022 with the filtered oscillating signal from the filter module 1026 and the oscillator module 1028.

The filter modules 1012, 1016, 1026, and 1030 may comprise filters configured to filter the signal. The filter modules 1012, 1016, 1026, and 1030 may comprise many different types of filters (e.g., bandpass filter, low pass filter, high pass filter, or the like) with many different electrical properties. In one example, the filter module 1012 may be a band pass filter configured to filter the oscillation signal (or components of the signal) provided from the oscillator module 1014. Similarly, filter modules 1012, 1016, 1026, and 1030 may filter signals (or components of the signals) from the oscillator module 1014, the oscillator module 1028, the mixer module 1010, or the mixer module 1024, respectively.

The oscillator modules 1014 and 1028 may comprise oscillators configured to provide an oscillating signal that may be used to upconvert the signal. The oscillator modules 1014 and 1028 may comprise any kind of oscillator with any different electrical properties. In one example, the oscillator module 1014 provides an oscillating signal to the filter module 1012. The oscillator module 1028 may provide an oscillating signal to the filter module 1026.

The oscillator modules 1014 and 1028, either individually or together, may be local or remote. In one example, the oscillating module 1014 and/or the oscillating module 1028 may be remotely located and configured to provide an oscillating signal to one or more transmitting radio frequency units. In some embodiments, a single oscillating module may provide an oscillating signal to both the mixer module 1010 and 1024, respectively (e.g., optionally via a filter). In one example, the oscillator signal from the oscillator module may be altered (e.g., oscillation increased or decreased) and provided to a different part of the circuit.

The signal quality module 1034 may be configured to generate a phase control signal to control the phase of a processed signal. In one example, the signal quality module 1034 receives the upconverted RF signal from the power amplifier 1032 and mixes the signal with the filtered oscillator signal or the upconverted signal from the second upconverter (e.g., mixer module 1024, filter module 1026, and oscillator module 1028). The signal quality module 1034 may filter the signal and compare the filtered, mixed signal with a predetermined phase value to generate a phase control signal based on the comparison.

The phase adjuster 1018 may comprise a variable phase control circuit configured to increase or decrease the phase of the signal to be transmitted. The phase adjuster 1018 may comprise any different type of phase adjuster or phase shifter with different electrical properties. In one example, the phase adjuster 1018 increases or decreases the phase of the signal received from the filter module 1016. The phase adjuster 1018 may adjust the phase of the signal based on the phase control signal from the signal quality module 1034.

The phase adjuster 1018 may include one or more components. For example, the phase adjuster 1018 may comprise one or more phase control elements.

The AGC module 1020 may comprise an automatic gain control (AGC) circuit configured to increase or decrease the gain of the signal received from the phase adjuster 1018. The AGC module 1020 may comprise many different types of AGCs with many different electrical properties. In one example, the AGC module 1020 increases or decreases the gain of the signal received from the phase adjuster 1018. The AGC module 1020 may adjust the gain of the signal based on the gain control signal.

In various embodiments, in order to adjust the phase of the signal or the amplitude of the signal, the signal quality module 1034 may provide control signals to adjust the in-phase (I) and quadrature (Q) signals to achieve a desired adjustment. For example, in order to adjust the phase or amplitude of the signal, the signal quality module 1034 may utilize the digital signal DSP to adjust the in-phase (I) and quadrature (Q) signals provided to the modem module 1004 to achieve the desired adjustment based on the predetermined phase value and/or the predetermined amplitude value. In another example, in some embodiments, the signal quality module 1034 may utilize the modem module 1004 to adjust the in-phase (I) and quadrature (Q) signals provided to the predistortion module 1006.

The amplification/attenuation module 1022 may comprise an amplifier and/or an attenuator configured to amplify and/or attenuate a signal. The amplification/attenuation module 1022 may be any kind of amplifier(s) and/or attenuator(s). Further, the amplification/attenuation module 1022 may comprise amplifiers and/or attenuators with any kind of electrical properties. The power amplifier 1032 may amplify the signal to be transmitted. It will be appreciated that the power amplifier 1032 may add noise to the signal to be transmitted (e.g., nonlinear noise) which may be dynamically canceled through the addition of distortion in the signal to be transmitted by the predistortion module 1006.

In some embodiments, the amplifier/attenuator module 1022 receives a signal from the AGC module 1020. The amplifier/attenuator module 1022 may amplify or attenuate the signal. Further, the power amplifier 1032 may amplify power of the signal (or components of the signal) after the signal has been upconverted by the mixer module 1024, the filter module 1026, and the oscillator module 1028. The power amplifier 1032 may then provide the signal to the signal quality module 1034 and/or the waveguide filter 1048.

The transceiver radio frequency unit 1002 may comprise the waveguide filter 1048, the waveguide 1050, and/or a diplexer. The waveguide filter 1048 may be any filter coupled to the waveguide 1050 and configured to filter the electromagnetic waves (e.g., remove noise). The waveguide 1050 may provide the signal to the antenna via a diplexer. The diplexer may provide the signal to the antenna. Similar to the waveguide 1046, the waveguide 1050 may be any waveguide kind or type of waveguide.

In various embodiments, by utilizing open loop calibration, the total phase and amplitude for the whole transmitter path may be calibrated from I and Q input to the output of the power amplifier 1032. In some embodiments, by calibration and look-up tables, the phase and amplitude may be accurately detected, controlled, and set at the Tx output directly or through adjusting I and Q signals at the input. The phase offset calculation, as discussed herein, may be processed at the PHY level (as opposed to the packet level). With PHY level processing, at least some systems and methods described utilize the block data level (block level) of the airframe, the symbol level of the airframe, or any combination of both.

Blocks of data may be mapped by the modem into symbols to be transmitted by the radio and are de-mapped by the modem using symbols received from the radio. The start of the airframe may be timestamped locally either at the block level or at the symbol level. In various embodiments, both sides of a wireless link timestamp the airframe in the same manner to provide a symmetrical environment from the time point of view.

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used without departing from the broader scope of the present invention. Therefore, these and other variations upon the exemplary embodiments are intended to be covered by the present invention(s).

The invention claimed is:

1. A method performed by a router, the method comprising:
   determining total available bandwidth on a wireless channel;
   receiving a new path request from an external device to reserve an amount of bandwidth on the wireless channel, the new path request including a setup priority level of a plurality of different priority levels and including a hold priority level of the plurality of different priority levels, the setup priority level indicating priority for establishing a new bandwidth reservation for the new path request, the hold priority level indicating priority for maintaining an established bandwidth reservation once bandwidth is reserved on the wireless channel for the new path request;
   tracking reserved or unreserved bandwidth at each of the plurality of different priority levels based of one or more established bandwidth reservations on the wireless channel and on more respective hold priority levels of one or more prior path requests associated with the one or more established bandwidth reservations on the wireless channel;
   establishing the new bandwidth reservation on the wireless channel in response to the new path request based on the setup priority level and based on the tracked reserved or unreserved bandwidth at each of the plurality of different priority levels, the establishing the new bandwidth reservation including
      if the unreserved bandwidth at the setup priority level is greater than the amount of bandwidth requested by the new path request and the total available bandwidth is greater than an amount of total reserved bandwidth on the wireless channel, then establishing the new bandwidth reservation on the wireless channel without removing any established bandwidth reservation;
      if the unreserved bandwidth at the setup priority level is less than the amount of bandwidth requested by the new path request, then preempting the new path request; and
      if the difference between total available bandwidth on the wireless channel and total reserved bandwidth is less than the amount of bandwidth requested by the new path request, then attempting to remove at least one established bandwidth reservation having a lower hold priority level than the setup priority level of the new path request to make room for the new bandwidth reservation.

2. The method of claim 1, wherein the total available bandwidth is based on coding modulation over the wireless channel.

3. The method of claim 2, further comprising changing the coding modulation due to changes in weather conditions affecting a quality of the wireless channel.

4. The method of claim 1, wherein the wireless channel is a microwave wireless channel.

5. The method of claim 1, further comprising directing the new path request to an alternate path when the new path request is preempted.

6. The method of claim 1, wherein an RSVP table indicates the previously reserved or unreserved bandwidth at each of the plurality of different priority levels.

7. The method of claim 1, further comprising:
   if a change in total available bandwidth results in the total reserved bandwidth exceeding total available bandwidth, then preempting a particular established bandwidth reservation associated with the lowest hold priority level; and
   after preempting the particular established bandwidth reservation, updating the reserved or unreserved bandwidth of one or more priority levels of the plurality of priority levels.

8. The method of claim 7, further comprising:
   after preempting the particular established bandwidth reservation associated with the lowest hold priority level, determining whether the total reserved bandwidth still exceeds the total available bandwidth;
   if the total reserved bandwidth still exceeds the total available bandwidth, preempting another bandwidth reservation associated with the next-lowest hold priority level; and
   after preempting the other established bandwidth reservation, updating the reserved or unreserved bandwidth of one or more priority levels of the plurality of priority levels.

9. A system comprising:
   a router configured to:
      determine total available bandwidth on a wireless channel;
      receive a new path request from an external device to reserve an amount of bandwidth on the wireless channel, the new path request including a setup priority level of a plurality of different priority levels and including a hold priority level of the plurality of different priority levels, the setup priority level indicating priority for establishing a new bandwidth reservation for the new path request, the hold priority level indicating priority for maintaining an established bandwidth reservation once bandwidth is reserved on the wireless channel for the new path request;
      track reserved or unreserved bandwidth at each of the plurality of different priority levels based of one or more established bandwidth reservations on the wireless channel and on more respective hold priority levels of one or more prior path requests associated with the one or more established bandwidth reservations on the wireless channel;
      establish the new bandwidth reservation on the wireless channel in response to the new path request based on the setup priority level and based on the tracked reserved or unreserved bandwidth at each of the plurality of different priority levels, the establishing of the new bandwidth reservation including if the unreserved bandwidth at the setup priority level is greater than the amount of bandwidth requested by the new path request and the total available bandwidth is greater than an amount of total reserved bandwidth on the wireless channel, then establish the new bandwidth reservation on the wireless channel without removing any established bandwidth reservation;

if the unreserved bandwidth at the setup priority level is less than the amount of bandwidth requested by the new path request, then preempt the new path request; and if the difference between total available bandwidth on the wireless channel and total reserved bandwidth is less than the amount of bandwidth requested by the new path request, then attempt to remove at least one established bandwidth reservation having a lower hold priority level than the setup priority level of the new path request to make room for the new bandwidth reservation.

10. The system of claim 9, wherein the total available bandwidth is based on coding modulation over the wireless channel.

11. The system of claim 10, wherein the router is further configured to modify the coding modulation due to changes in weather conditions affecting a quality of the wireless channel.

12. The system of claim 9, wherein the wireless channel is a microwave wireless channel.

13. The system of claim 9, wherein the router is further configured to direct the new path request to an alternate path when the new path request is preempted.

14. The system of claim 9, wherein an RSVP table indicates the previously reserved or unreserved bandwidth at each of the plurality of different priority levels.

15. The system of claim 9, wherein the router is further configured to if a change in total available bandwidth results in the total reserved bandwidth exceeding total available bandwidth, then preempt a particular established bandwidth reservation associated with the lowest hold priority level; and after preempting the particular established bandwidth reservation, update the reserved or unreserved bandwidth of one or more priority levels of the plurality of priority levels.

16. The system of claim 15, wherein the router is further configured to after preempting the particular established bandwidth reservation associated with the lowest hold priority level, determine whether the total reserved bandwidth still exceeds the total available bandwidth;

if the total reserved bandwidth still exceeds the total available bandwidth, preempt another bandwidth reservation associated with the next-lowest hold priority level; and after preempting the other established bandwidth reservation, update the reserved or unreserved bandwidth of one or more priority levels of the plurality of priority levels.

17. A non-transitory computer readable medium comprising executable code, the code being executable by at least one router processor to perform a method, the method comprises:

determining total available bandwidth on a wireless channel;

receiving a new path request from an external device to reserve an amount of bandwidth on the wireless channel, the new path request including a setup priority level of a plurality of different priority levels and including a hold priority level of the plurality of different priority levels, the setup priority level indicating priority for establishing a new bandwidth reservation for the new path request, the hold priority level indicating priority for maintaining an established bandwidth reservation once bandwidth is reserved on the wireless channel for the new path request;

tracking reserved or unreserved bandwidth at each of the plurality of different priority levels based of one or more established bandwidth reservations on the wireless channel and on more respective hold priority levels of one or more prior path requests associated with the one or more established bandwidth reservations on the wireless channel;

establishing the new bandwidth reservation on the wireless channel in response to the new path request based on the setup priority level and based on the tracked reserved or unreserved bandwidth at each of the plurality of different priority levels, the establishing the new bandwidth reservation including if the unreserved bandwidth at the setup priority level is greater than the amount of bandwidth requested by the new path request and the total available bandwidth is greater than an amount of total reserved bandwidth on the wireless channel, then establishing the new bandwidth reservation on the wireless channel without removing any established bandwidth reservation;

if the unreserved bandwidth at the setup priority level is less than the amount of bandwidth requested by the new path request, then preempting the new path request; and if the difference between total available bandwidth on the wireless channel and total reserved bandwidth is less than the amount of bandwidth requested by the new path request, then attempting to remove at least one established bandwidth reservation having a lower hold priority level than the setup priority level of the new path request to make room for the new bandwidth reservation.

* * * * *